March 12, 1935. L. S. HOLSTEIN ET AL 1,994,358
PURIFICATION OR SEPARATION OF METALS
Filed June 23, 1934
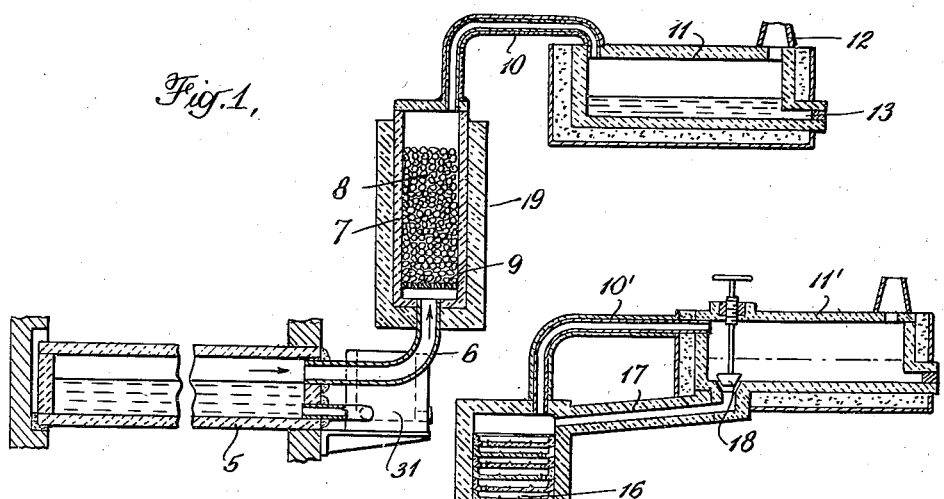
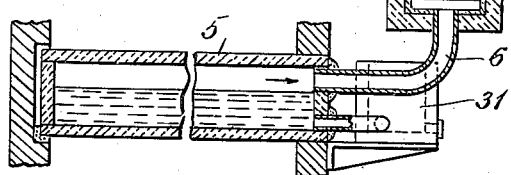
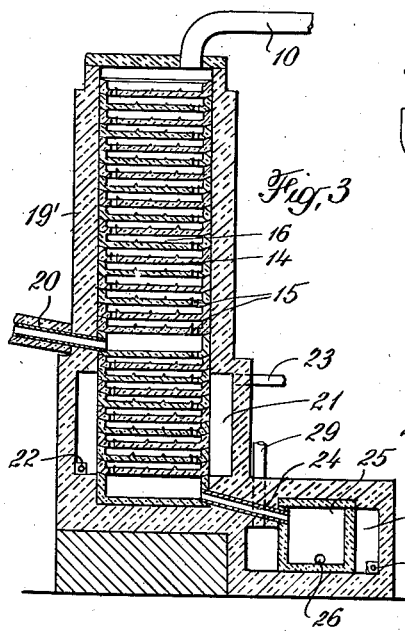
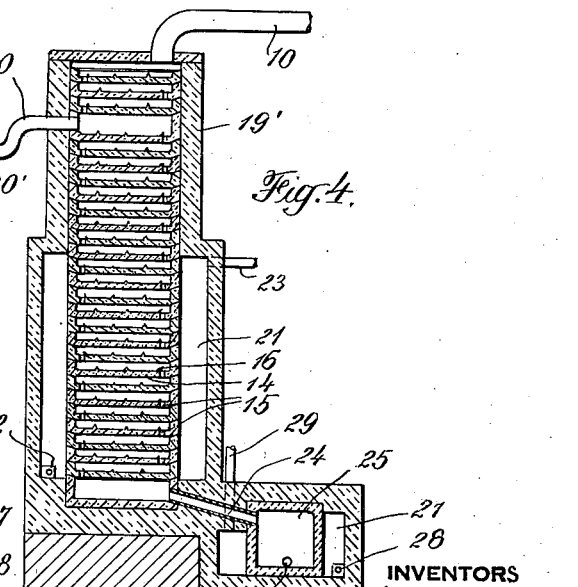
INVENTORS
Leon S. Holstein
Philip M. Ginder
BY Pennie, Davis, Marvin & Edmonds
ATTORNEYS

UNITED STATES PATENT OFFICE 1,994,358

PURIFICATION OR SEPARATION OF METALS

Leon S. Holstein, Great Neck, N. Y., and Philip M. Ginder, Palmerton, Pa., assignors to The New Jersey Zinc Company, New York, N. Y., a corporation of New Jersey Application June 23, 1934, Serial No. 732,050

10 Claims. (Cl. 75—17)

The present invention relates to the purification or separation of metals, and has for its object an improved method of purifying or separating metals. Briefly, the invention contemplates the purification or separation of metals by reflux condensation or rectification.

Volatile metals such as for example zinc have previously been purified from constituents less volatile than zinc by redistillation. However, the degree of purification obtainable by this method is limited by the partial pressure of the impurities such as lead at the boiling point of the zinc to be purified. Moreover, even the theoretical degree of purification obtainable by redistillation has rarely if ever been secured in practice because of the entrainment of metallic mist or droplets in the vapors of the redistilled metal and because of the formation of vapor rich in impurities with high boiling points on account of the volatilization of such metallic mist or droplets from the boiling bath in superheated vapor.

Attempts have heretofore been made to improve the purification of metals by fractional condensation of the vapor obtained by redistillation. These proposals involve the condensation of the vapor in several separate fractions. The fraction first condensed contains a relatively large proportion of the relatively less volatile constituents so that subsequent fractions are impoverished therein. On the other hand, the fraction last condensed will be enriched in the relatively high volatile constituents and the intermediate fractions will be relatively pure with respect to both high volatile and relatively low volatile constituents. The degree of purity obtainable by this method is, however, likewise limited, and furthermore the purified fraction or fractions obtainable therewith represent only a small proportion of the metal originally treated, while the relatively impure fractions obtained represent a substantial proportion of the metal treated and are even more impure than the original metal.

The method of the present invention contemplates the purification or separation of metals to a degree not possible by these prior art methods. The invention is broadly characterized by subjecting the metal to be purified in vapor form to countercurrent and intimate contact with refluxing molten metal formed by condensation of the vapor. An important result of such intimate countercurrent contact is to purify or separate the metals by rectification. In carrying out the invention, a flowing stream of vapor, derived in any appropriate manner from the metal to be purified or separated, is brought into intimate countercurrent contact with a refluxing condensate formed from the vapor in the course of which contact the vapor stream becomes progressively impoverished and the refluxing condensate becomes progressively enriched in the metal (or metals) of relatively higher boiling temperature. Vapor and refluxing molten metal are delivered for appropriate separate recovery at the opposite ends of the zone of intimate countercurrent contact between the vapor and refluxing condensate.

In a preferred form of the invention, the metallic vapor to be purified, produced either by boiling impure metal in a retort or the like or originating from a smelting operation in which impure metallic vapor is evolved, is passed into an upright (vertical or sloping) column where it is subjected to intimate countercurrent contact with a descending condensate formed from the metallic vapor. A highly efficient method of operating such a reflux column (reflux condenser or rectifying column) is to provide heat insulation around all of the column except its top, so that the refluxing molten metal is formed for the most part by condensation at the top of the column. The entire column may be heat insulated (either by surrounding it with material of low heat conductivity or by surrounding it with heating flues maintained at an appropriate temperature) and the refluxing condensate may be formed in a condenser or dephlegmator operatively associated with the top of the reflux column, and the reflux condensate may then be permitted to flow by gravity from the condenser or dephlegmator into the reflux column. The refluxing condensate may also be formed entirely or in part by the cooling effect produced by the introduction in molten or solid form of all or part of the metal to be volatilized into the reflux column, from whence molten metal flows into the retort where it is volatilized.

When practising the invention to purify a metal from impurities that are less volatile than the metal itself, that is to say that have a lower vapor pressure or a higher boiling point, for example to purify zinc from lead, the purified product is the vapor escaping from the top of the reflux column or the molten metal collected in the dephlegmator or condenser in communication with the top of the column, while the impurities with higher boiling point (lower vapor pressure) are carried down the reflux column whence they may be returned to the redistilling retort or other source of the vapor to be purified.

When practising the invention to purify a metal from impurities that are more volatile than the metal itself, that is to say that have a greater vapor pressure or a lower boiling point, for example to purify zinc from cadmium, the purified product is the molten reflux descending through the reflux column and it may be collected at the base of the column or in a distilling retort connected with the base of the column.

When practising the invention to separate a mixture of metals of different boiling points, the metal with the lower boiling point is obtained at the top of the reflux column either in vapor form or in molten form in a dephlegmator or condenser connected with the top of the column, and the metal with higher boiling point is obtained in molten form at the base of the column or in a distilling retort or sump connected with the base of the column.

The reflux condenser or rectifying column may be fed with metallic vapor or with the raw material to be purified in molten or solid form, as hereinbefore mentioned.

When vapor is fed to the reflux column it should enter the column either at the bottom or at a point intermediate the ends of the column. When the raw material to be purified is fed directly into the column, it may be charged into the top of the column in solid or molten form; but a higher degree of purification is obtained by introducing it in molten form at a point intermediate the top and the bottom of the column.

The invention will be better understood from the following description taken in conjunction with the accompanying drawing in which, Fig. 1 is a diagrammatic sectional elevation of an apparatus adapted for the practice of the invention, and Figs. 2, 3 and 4 are diagrammatic sectional elevations of modified forms of such an apparatus.

Referring to Fig. 1 of the drawing, a retort 5 for boiling metal is connected by an elbow pipe 6 to the base of a reflux column 7. The reflux column 7 is packed with filling material 8 so arranged as to be readily permeable to vapor and molten metal and to distribute the vapor and molten metal uniformly over the cross section of the column and thus bring about intimate contact between the ascending vapor and the refluxing molten metal. The filling material 8 is supported on a perforated plate 9 at the base of the column. The top of the column is connected by an elbow pipe 10 with a condenser 11, which is provided with a vent 12 for the escape of permanent gases and with a tap hole 13 for the removal of condensed molten metal.

In the apparatus illustrated in Fig. 2, the reflux column is provided (in lieu of the packing 8 of Fig. 1) with staggered horizontal baffles in the form of superposed trays. Thus, the reflux column is built up of superposed rectangular trays 14 of appropriate refractory material, having beveled top and bottom edges so that they may be stacked one above another to form the column. The bottom of each tray has a transverse opening 15 approximate one end thereof. The upper surface of each tray is provided with transverse ribs 16 parallel to the opening 15; the ribs being of progressively increased height from the opening 15 towards the other end of the tray. The trays 14 are stacked with their openings 15 staggered to form a column of superposed baffles through which metallic vapor ascends and molten metal descends in tortuous or zig-zag paths. The ribs 16 serve to retain shallow pools of molten metal on the trays. The cascade effect of molten metal pouring over the ribs and falling from tray to tray facilitates intimate contact between ascending vapor and descending molten metal. The condenser is connected to the top of the reflux colum not only by the elbow pipe 10' which conducts vapor from the top of the reflux column to the condenser but by a pipe 17 which returns part of the molten metal condensed in the condenser 11' to the top of the reflux column, through which the returned molten metal refluxes. A valve 18 is provided for regulating and controlling the amount of molten metal returned to the reflux column.

The reflux column in Fig. 1 is advantageously surrounded with heat insulation 19, except at the top, and the reflux column in Fig. 2 is advantageously surrounded throughout (including the top) with heat insulation 19'.

In the apparatus of Fig. 3, the metal to be purified (which in this case may be in vapor or molten form) is introduced through an inlet pipe 20 at a point intermediate the top and bottom of the reflux column. The reflux column is built up of superposed trays 14 (as in Fig. 2) and is surrounded with heat insulation except at its top. The lower part of the reflux column is surrounded for an appropriate length thereof by a combustion chamber or heating laboratory 21 provided with a fuel gas burner 22 and a flue 23 for the escape of exhaust combustion gases. The base or lower end of the column communicates through a conduit 24 with a molten metal sump 25, provided with a tap hole 26 and externally heated by a combustion chamber 27 having a burner 28 and a stack 29 for the escape of exhaust combustion gases.

The apparatus illustrated in Fig. 4 is generally similar to that of Fig. 3, except that the metal to be purified or refined is introduced in molten form into the top of the reflux column through a charging well 30, and consequently a somewhat greater length of the column is surrounded by the combustion chamber 21. In all figures of the drawing the same reference characters indicate the same or equivalent elements.

In practising the invention in the apparatus of Fig. 1 for purifying a metal from one or more relatively less volatile constituents or contaminants, the metal to be purified is introduced by appropriate means into the retort 5 which is heated by a combustion chamber surrounding it. A charging well 31 may, for example, be provided to supply molten metal to the retort. Vapor evolved in the retort 5 is conducted through the elbow pipe 6 into the base of the reflux column. The heat insulation 19 surrounding the reflux column maintains the column at a temperature substantially the same as the boiling point of the vapor traversing the column. Molten metal is formed by condensation of vapor at the uninsulated top of the column and refluxes down through the column. The filling material 8 distributes the refluxing molten metal uniformly throughout the cross section of the reflux column and brings about intimate countercurrent contact of the ascending vapor and descending molten metal. The ascending vapor becomes progressively impoverished in the less volatile constituent (or constituents) and the descending (refluxing) molten metal becomes progressively enriched in such constituent (or constituents). Purified vapor escapes from the reflux column through the elbow pipe 10 and enters the condenser 11, where it is condensed to purified molten metal. Any permanent gases that enter the system escape from the condenser through the vent 12. The purified product is withdrawn from the condenser through the tap hole 13. The molten metal refluxing down through the reflux column carries the relatively less volatile impurities through the reflux column and through the elbow pipe 6 back to the retort 5, where such impurities accumulate. When the concentration of these impurities in the retort 5 becomes so high that the vapor evolved from the retort can no longer be satisfactorily purified in the reflux column, the residue in the retort containing these high boiling point impurities is removed through a tap hole. Ordinarily the retort is charged at frequent intervals with molten metal through a charging well and residue rich in high boiling point impurities is removed through the tapping hole of the retort at less frequent intervals.

As the distilling operation proceeds, the vapor evolved from the retort 5 and entering the reflux column will become gradually richer in impurities with high boiling points on account of the progressively increasing concentration of such impurities in the retort. The purity of the purified vapor leaving the reflux column through the pipe 10 may nevertheless be kept constant by gradually increasing the amount of refluxing molten metal descending through the reflux column. This may be effected by progressively increasing the degree of cooling of the top of the reflux column, either by removing progressively part of the heat insulation 19 or by air cooling the top of the reflux column progressively by a regulable blast of air. In many cases it will not be necessary to adopt either of these expedients.

When the invention is practised in the apparatus of Fig. 1 for purifying a metal from relatively more volatile impurities, the volatile impurities are discharged from the top of the reflux column through the tube 10 and collect in the condenser 11. The purified metal refluxes through the reflux column and collects in the retort 5, from whence it is tapped at appropriate intervals. It will be understood that in this case the purified metal will be tapped from the retort immediately before introducing a fresh batch of impure metal to be purified into the retort.

Where the apparatus of Fig. 1 is employed in the practice of the invention for the separation and recovery in pure form of two metals from an alloy thereof, the metal with higher boiling point collects in purified form in the retort 5 and the metal with lower boiling point collects in the condenser 11. It will be understood that the more volatile metal can be tapped from the condenser as desired, while the purified metal of higher boiling point must be tapped from the retort immediately before introducing a fresh charge of alloy to be separated into the retort.

The practice of the invention in the apparatus of Fig. 2 is analogous to that described in connection with Fig. 1. However, the reflux molten metal descending through the reflux column is supplied in regulated amount from the condenser 11 and enters the top of the reflux column through the pipe 17. The staggered baffles or trays 14 of the reflux column cause the ascending metal vapor and descending molten metal to traverse a zig-zag countercurrent path in intimate contact.

In practising the invention in the apparatus of Fig. 3, the metal to be purified is introduced either in molten or vapor form through the inlet pipe 20. It will be understood that when metal is introduced in molten form through the pipe 20, a liquid seal must be provided to prevent the entrance of air into the reflux column (such a liquid seal is shown at 30' in Fig. 4). In the reflux column, the metal undergoing treatment is subjected to both volatilization and condensation and the vapor formed passes upwards through the reflux column in intimate countercurrent contact with descending molten metal. Metal is boiled in the lower portion of the reflux column, surrounded by the heating chamber 21. Molten metal is formed by condensation of vapor at the uninsulated top of the reflux column and descends through the column in countercurrent with the vapor, either evolved by boiling in the lower portion of the reflux column or entering the column through the inlet 20 or both. This form of apparatus is particularly appropriate for purifying a metal from constituents with lower boiling points. In this case, purified molten metal is withdrawn from the sump 25 through the tap hole 26 at appropriate intervals, while the more volatile impurities escape through the outlet 10 and are appropriately recovered.

In purifying a metal from a constituent of lower boiling point, such as purifying zinc from cadmium, in an apparatus of the type shown in Fig. 3, the firing of the combustion chambers 21 and 27 is so adjusted and regulated as to rectify continuously the mixture of metals entering the reflux column through the pipe 20. In this manner, the ascending vapor is progressively enriched in the contaminant (e. g. cadmium) and the descending molten metal (refluxing condensate) is progressively freed from the contaminant. Purified metal is recovered from the base of the column and a vapor rich in the contaminant is delivered from the top of the column and appropriately recovered.

In practising the invention in the apparatus of Fig. 4, molten metal is introduced at or near the top of the reflux column through the charging well 30. The introduction of this molten metal into the top of the reflux column brings about condensation of part of the vapor ascending through the column, so that a reflux condensate is thereby formed. The vapor ascending through the column is produced by boiling in the lower portion of the column surrounded by the heating chamber 21. Constituents with high boiling points collect in the sump 25, from whence they are removed through the tap hole 26, while constituents with low boiling points escape from the top of the column through the outlet 10 and are appropriately recovered. If purified vapor is to be obtained through the outlet 10, care must be taken to avoid contaminating this vapor with droplets of metal produced by splashing or ebullition of the molten feed entering through the charging well 30. It is advantageous for this reason to construct the apparatus as shown in the drawing, with one or more of the baffles 14 situated above the point of inlet of the charging well 30 and guarding the vapor outlet 10 from metal sprayed by splashing or ebullition. In the apparatus of Figs. 1, 2 and 3, any metal mist formed by ebullition or splashing is scrubbed from the gases by the descending molten metal. Metals that do not form mixtures with constant boiling point (azeotropic mixtures) may be separated from each other to any desired degree in accordance with the invention. In case of mixtures of metals that form constant boiling point or azeotropic mixtures, the degree of purification obtainable by the method of the invention is limited, unless special methods of varying the pressure within the reflux column are employed or unless constituents are added to the material to be refined that inhibit the formation of such constant boiling point mixtures. Examples of metals that form constant boiling point mixtures are bismuth-antimony and antimony-lead.

In applying the principles of the invention to any particular alloy or impure metal, simple preliminary experiments will indicate the optimum operating conditions, such as the height of the rectifying column, the amount of heat insulation to be associated therewith, the amount of heat supplied at or near the base of the column, the temperature gradient throughout the column, and the amount of refluxing condensate. In general, the less or smaller the difference in boiling temperatures or vapor pressures of the metals to be separated the longer (or higher) should be the rectifying column. For practical considerations, the metals to be separated should have substantially different boiling temperatures or vapor pressures, say, for example, of the order of magnitude indicated by the illustrative groups of metals herein mentioned, so that the composition of the vapor evolved from their mixtures during boiling will differ from the composition of the boiling molten mixture.

The following are examples of groups of metals readily separated by the method of the invention:

Cadmium-lead, cadmium-zinc, cadmium-zinc and lead, cadmium-copper, cadmium-bismuth.

Zinc-lead, zinc-antimony, zinc-copper.

Magnesium-lead, magnesium-aluminum, magnesium-antimony.

Mercury-bismuth, mercury-cadmium, mercury-arsenic, mercury-zinc.

It will be understood in each case that the apparatus employed must be constructed of an appropriate material such as for example a high grade refractory, e. g. silicon carbide, capable of resisting the temperatures applied and unaffected by the vapor and molten metal formed during the operation.

The method of the invention may be carried out in various forms and types of apparatus other than those hereinbefore described. In the selection and construction of such apparatus, attention should be given to the following general principles:

(1) It is advantageous to form the refluxing molten metal by condensation at the top of the reflux column so that the molten metal traverses the entire length of the reflux column.

(2) On this account it is desirable to heat-insulate the reflux column at all points except at the very top, or even to heat-insulate all the reflux column and form the refluxing molten metal in a separate condenser or dephlegmator.

(3) It is desirable to supply the necessary heat to the bottom of the reflux column. In the apparatus of Figs. 1 and 2, the volatilizing retorts attached to the bottom of the reflux columns serve as heated bottoms of the reflux columns. In apparatus of the type shown in Figs. 3 and 4, heat must be supplied by direct heating of the bottom of the reflux columns.

(4) The purification or separation effected by the operations of reflux condensation or rectification is brought about by the tendency of the descending reflux condensate and the ascending vapor to reach equilibrium. It is therefore desirable to secure intimate and prolonged contact between the descending molten metal and the ascending vapor. For this reason it is desirable to provide the reflux column with adequate filling material or baffles to bring about an intimate contact of the descending condensate and the ascending vapor.

The following examples of the practice of the invention are illustrative and in no sense restrictive or limiting of its scope or application. Impure zinc metal contaminated with lead was distilled in a retort and the resulting vapor introduced into a reflux column of the type shown in Fig. 1. The reflux column was 27 inches high and 7½ inches in diameter (internal dimensions) and was packed with coke crushed to about ¾ inch. Approximately 2400 pounds of metal were volatilized per day of 24 hours, and approximately 20% of the vapor entering the reflux column was returned to the retort as refluxing condensate. The impure zinc metal contained .06% lead, and the retort was continuously operated until the lead content of the molten metal therein had built up to about 4%. The purified zinc averaged .003% lead, the metal condensed directly after the commencement of the operation containing approximately .001% lead and that condensed immediately preceding the end of the operation (cleaning out of the retort) containing approximately .006% lead. In another operation, with a reflux column built-up of trays similar to those of Figs. 2, 3 and 4, there was obtained in a run of seven days' continuous operation a purified zinc metal containing less than .002% lead, from an impure zinc metal containing about 1% lead. The molten metal in the retort contained 20% lead after the seven days of continuous operation.

Practising the invention for the purification of zinc metal containing 0.46% cadmium, in an apparatus of the type shown in Fig. 3, 95.6% of the zinc was recovered in a purified product containing 0.0041% cadmium, representing a cadmium elimination of 99.1%.

The invention may be advantageously applied to the purification of zinc alloy scrap contaminated with lead, iron, copper, tin and aluminum. The following example illustrates such a practice of the invention:

| Composition | Zn | Pb | Fe | Cd | Cu | Sn | Al |
| --- | --- | --- | --- | --- | --- | --- | --- |
| Charge metal | | 1.6% | .20 | .13 | 3.2 | 3.4 | 2.9 |
| Refined metal | | .0025 | .002 | .22 | .0003 | .0001 | .0005 |
| Retort residue | 56.8 | 5.9 | .03 | .00035 | 10.4 | 11.2 | 7.9 |

The operation was carried out in an apparatus similar to Fig. 1, with the reflux column provided with trays similar to Fig. 2, for the removal from the impure scrap of the high boiling point contaminants; hence the cadmium content of the purified product was increased. A large proportion of the original iron of the impure scrap was present in a scum on the retort residue, thus accounting for the apparent loss of iron in the analysis of the residue.

In applying the principle of the invention to an alloy of 70% cadmium and 30% mercury in a fractionating column 18 inches in length there was obtained from the vapor withdrawn from the top of the column a condensate analyzing 99.9+% mercury. The cadmium in the first portion of this condensate was 0.00% and in the last portion was 0.03%. The residual metal in the retort at the end of the operation analyzed 97% cadmium and 3% mercury. In a similar operation, an alloy of 80.5% bismuth and 19.5% mercury was separated into a condensate analyzing 99.9+% mercury and a residual retort metal analyzing 99.8% bismuth with a trace of mercury. Each of these separations was carried out as a batch operation.

This application is a continuation in part of an application filed by us on May 28, 1931, Serial No. 540,566.

We claim:

1. The method of separating metals having substantially different boiling temperatures and purifying one metal with respect to the other or others which comprises subjecting a flowing stream of the vapors of the metals to intimate countercurrent contact with a refluxing condensate formed from said vapors containing metals with the different boiling temperatures in the course of which the vapor stream becomes progressively impoverished and the refluxing condensate becomes progressively enriched in the metal of relatively higher boiling temperature, and separately recovering vapor and molten metal at the opposite ends of the zone of intimate countercurrent contact between said vapors and refluxing condensate.

2. The method of separating two metals possessing substantially different vapor pressures and purifying one metal with respect to the other which comprises volatilizing a mixture of said metals and passing the resulting vapor upwardly through a reflux column, condensing a portion of said vapor and permitting the resulting condensate containing both metals to flow downward through said column and back into the volatilization source in countercurrent contact with the ascending vapor thereby enriching the vapor in its component of higher vapor pressure, and separately condensing the enriched vapor.

3. The method of separating two metals having substantially different boiling temperatures and that do not form azeotropic mixtures and purifying one metal with respect to the other which comprises volatilizing a mixture of the two metals and subjecting the resulting metallic vapor to intimate countercurrent contact with a refluxing condensate formed from said vapor and containing both metals and thereby obtaining a vapor rich in the metal of lower boiling temperature and refluxing molten metal rich in the metal of higher boiling temperature.

4. The method of separating two metals having substantially different boiling temperatures and that do not form azeotropic mixtures and purifying one metal with respect to the other which comprises volatilizing a mixture of the two metals, conducting the resulting metallic vapor into an upright reflux column insulated against loss of heat, forming a refluxing condensate containing both metals by condensation of said vapor above said heat-insulated reflux column, permitting said refluxing condensate to flow by gravity through said reflux column in intimate countercurrent contact with said vapor, and collecting metal of lower boiling temperature at the top of said column and metal of higher boiling temperature at the base of said column.

5. The method of separating metals having substantially different boiling temperatures and purifying one metal with respect to the other or others which comprises passing a stream of the vapor derived from a mixture of said metals through an upright reflux column, forming by condensation of said vapor a refluxing condensate containing the metals of different boiling temperatures, permitting said refluxing condensate to flow by gravity through said reflux column in intimate countercurrent contact with said vapor, and recovering the metal of lower boiling temperature at the upper end of said column and the metal of higher boiling temperature at the base of said column.

6. The method of purifying a metal with respect to a contaminant of substantially higher boiling temperature than the metal which comprises subjecting a flowing stream of the vapor derived from the impure metal to intimate countercurrent contact with a refluxing condensate formed from said vapor and containing a substantial portion of the metal to be purified and the contaminant of higher boiling temperature in the course of which the vapor becomes progressively impoverished and the refluxing condensate becomes progressively enriched in the contaminant, and separately recovering purified vapor of said metal and molten metal rich in said contaminant at opposite ends of the zone of intimate countercurrent contact between said vapor and refluxing condensate.

7. The improvement in the method of refining impure metal containing two metals having substantially different boiling points to purify one of the metals with respect to the other metal which comprises subjecting a flowing stream of the vapor derived from the impure metal to intimate countercurrent contact in a reflux column with a refluxing condensate formed from said vapor and containing said two metals, permitting the refluxing condensate to flow toward the bottom of the reflux column, progressively redistilling the refluxing condensate and subjecting the vapor thereof to reflux condensation, whereby the vapor becomes progressively impoverished and the refluxing condensate becomes progressively enriched in the metal of relatively higher boiling temperature, and separately recovering vapor and molten metal at the opposite ends of the zone of intimate countercurrent contact between said vapor and refluxing condensate.

8. A method of refining impure metal according to claim 7, in which the metal of higher boiling point is a contaminant present in relatively small amount compared with the total amount of metal present with the lower boiling point, substantially all of said contaminating metal with the higher boiling point being recovered in molten form from the bottom of the reflux column.

9. A method of refining impure metal according to claim 7, in which the reflux condensate flows from the bottom of the reflux column to the volatilization source of the flowing stream of vapor derived from the impure metal.

10. The method of purifying cadmium metal with respect to lead as a contaminant which comprises subjecting a flowing stream of the vapor derived from the impure metal to intimate countercurrent contact with a refluxing condensate formed from said vapor in the course of which the vapor becomes progressively impoverished and the refluxing condensate becomes progressively enriched with the lead, and separately recovering purified vapor of the cadmium and molten cadmium rich with lead at opposite ends of the zone of intimate countercurrent contact between said vapor and refluxing condensate.

LEON S. HOLSTEIN.
PHILIP M. GINDER.